United States Patent [19]

Nilsson

[11] 4,261,492
[45] Apr. 14, 1981

[54] SPARE-WHEEL CARRIER

[76] Inventor: Lars-Olof Nilsson, TransjöToragard, S-342 00 Alvesta, Sweden

[21] Appl. No.: 81,787

[22] Filed: Oct. 4, 1979

[30] Foreign Application Priority Data

Oct. 5, 1978 [SE] Sweden ................................ 7810428

[51] Int. Cl.³ ............................................ B62D 43/00
[52] U.S. Cl. .............................. 224/42.24; 224/42.21; 224/42.29
[58] Field of Search ............... 224/42.29, 42.06, 42.21, 224/42.23, 42.24, 42.26, 42.28

[56] References Cited

U.S. PATENT DOCUMENTS

| 1,656,654 | 1/1928 | Warwick | 224/42.29 |
| 2,674,394 | 4/1954 | Hall et al. | 224/42.24 |
| 2,931,549 | 4/1960 | Adkins | 224/42.24 |
| 3,831,793 | 8/1974 | Eller | 224/42.21 X |

*Primary Examiner*—Steven M. Pollard

*Attorney, Agent, or Firm*—Burns, Doane, Swecker & Mathis

[57] ABSTRACT

Spare-wheel carrier to be mounted on a chassis of a motor vehicle comprises a substantially horizontal backing plate adapted for connection with a vehicle. The backing plate carries a movable protruding hook positioned in such a way as to allow the central opening of a wheel rim to be rested thereupon for enabling the wheel to be swung about the hook to a position below the backing plate and substantially in parallellism therewith. The hook comprises one end of a movable supporting member, the other end of which constitutes a locking member. With the wheel in its securement position, the supporting member is moved whereby the locking member is displaced into engagement with the wheel rim to support same, and whereby the hook is displaced toward the backing member to press the wheel rim thereagainst.

4 Claims, 3 Drawing Figures

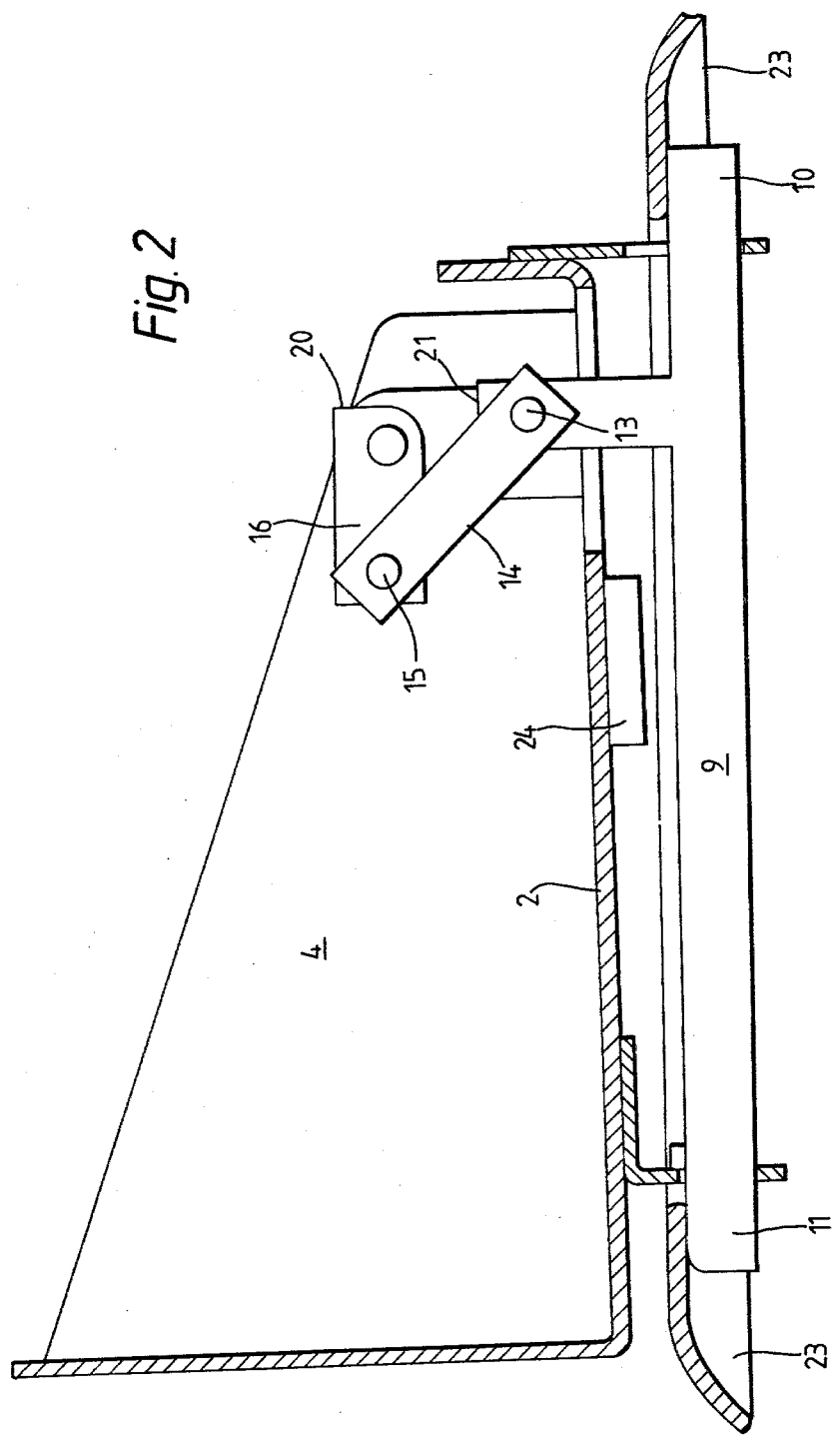

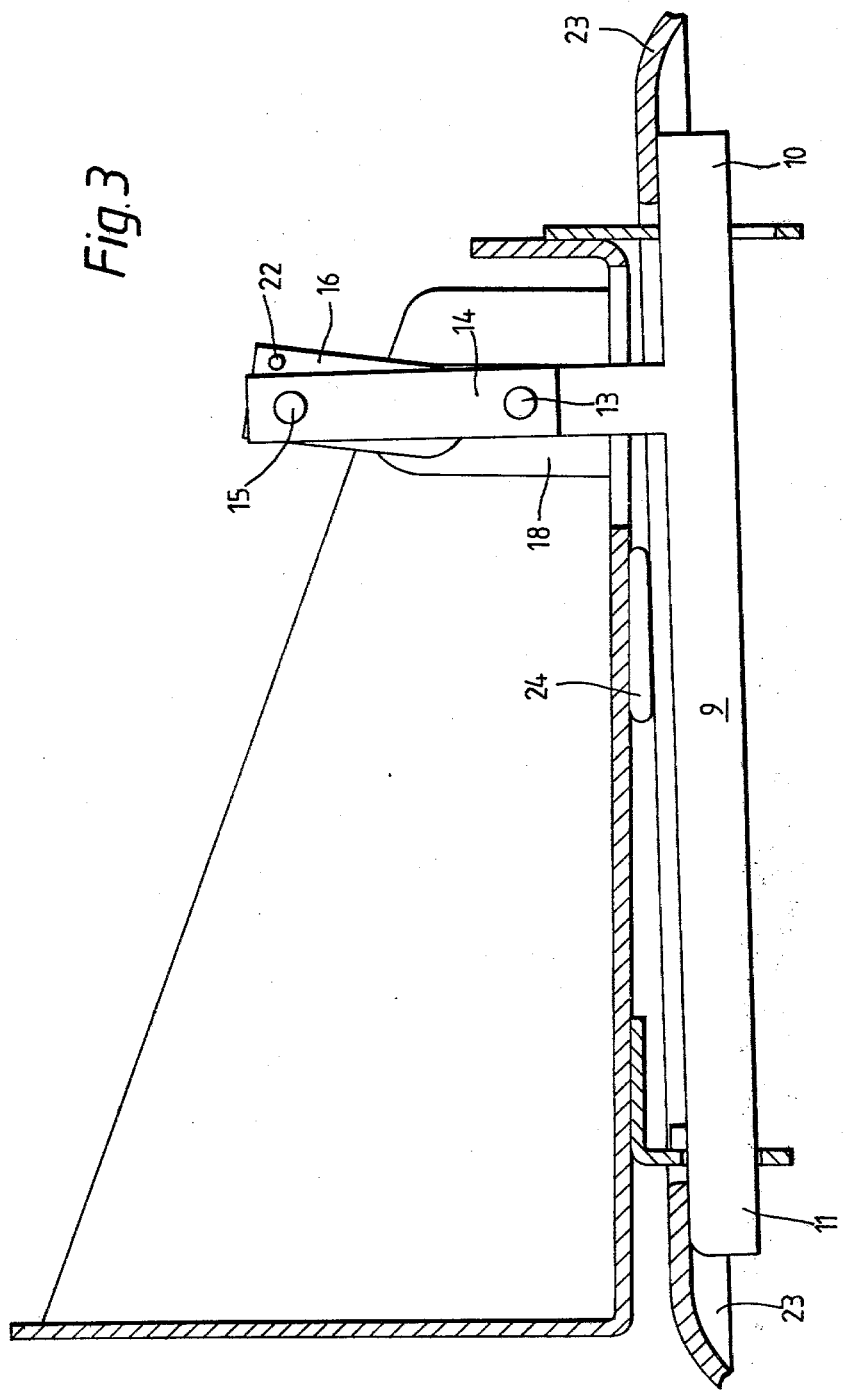

SPARE-WHEEL CARRIER

This invention relates to a spare-wheel carrier especially intended for being mounted on the chassis of a motor vehicle to secure a spare-wheel to the vehicle in a safe and vibration-free manner and to allow the spare-wheel to be mounted to and dismounted therefrom in a very simple manner.

Spare-wheels for small or medium sized lorries, trucks or heavy vans are usually carried under the vehicle in a horisontal attitude in a basket or the like. These baskets are often provided with locking bars fastened by means of screws and having the purpose of preventing the spare-wheel from unintendedly being removed from the basket. It is apparent that such an approach involves both a heavy and a difficult work to lift a spare-wheel up to or lower it down from such a basket. It is further apparent that due to the position of the basket the screws have a troublesome tendency of getting rusted in.

Other types of previously known spare-wheel carriers have screws for fastening the spare-wheel, the screws extending through the bolt holes of the wheel rim. This means that a certain carrier can only be used for carrying a certain type of wheel rim and further, the screws used will likely even after a short time get rusted in due to being freely exposed to water, road salt and the like.

Therefor, the purpose of this invention is to provide a spare-wheel carrier especially but not exclusively intended for spare-wheels of small and medium sized lorries or trucks, vans, buses or the like and being designed in such a way as not to be dependent on the bolt holes of the wheel rims for making it possible to fasten the wheels. Further, it is a purpose of the invention to provide a spare-wheel carrier designed in such a way as to avoid corrosion problems and to be very convenient to handle. According to the invention this is achieved by a spare-wheel carrier comprising a backing member carried by a motorvehicle, the backing member having connection with a hook. The hook is positioned in such a way that a first edge portion of a wheel rim at the central opening thereof can be brought into engagement with the hook for allowing the wheel to be swung about the hook to a position substantially in parallel with the backing member. The hook is movable together with a locking member, the latter being engageable with that side of a second edge portion of the rim remote from the backing member when the rim has been swung to its position substantially in parallellism with the backing member. The hook is also movable to a position closer to the backing member for urging the rim against the backing member.

In a preferred embodiment of the invention the hook and the locking member comprise opposite ends of a supporting member connected to the backing member in such a way as to be displacable in its longitudinal direction and swingable about an axis perpendicular thereto.

In order to achieve a simple operation of the supporting member, according to the invention, the supporting member, in the vicinity of the hook, is provided with an operating portion extending to that side of the backing member remote from the supporting member. The operating portion is connected to an actuation mechanism for displacing and swinging the supporting member.

The invention is now to be described more in detail reference 1 being made to the accompanying drawings.

Of these, FIG. 1 is a cross sectional view showing the inventive carrier when a spare-wheel is hanging in such a way from the protuding hook of the carrier that the hook engages in the central opening of the spare-wheel.

FIG. 2 shows the inventive carrier when the spare-wheel has been swung to a securement position below the carrier and the supporting member has been displaced to such a position as to completely support the spare-wheel.

FIG. 3 shows the inventive carrier when the spare-wheel has been locked in a position urged against the bottom side of the backing member.

Figure 1:
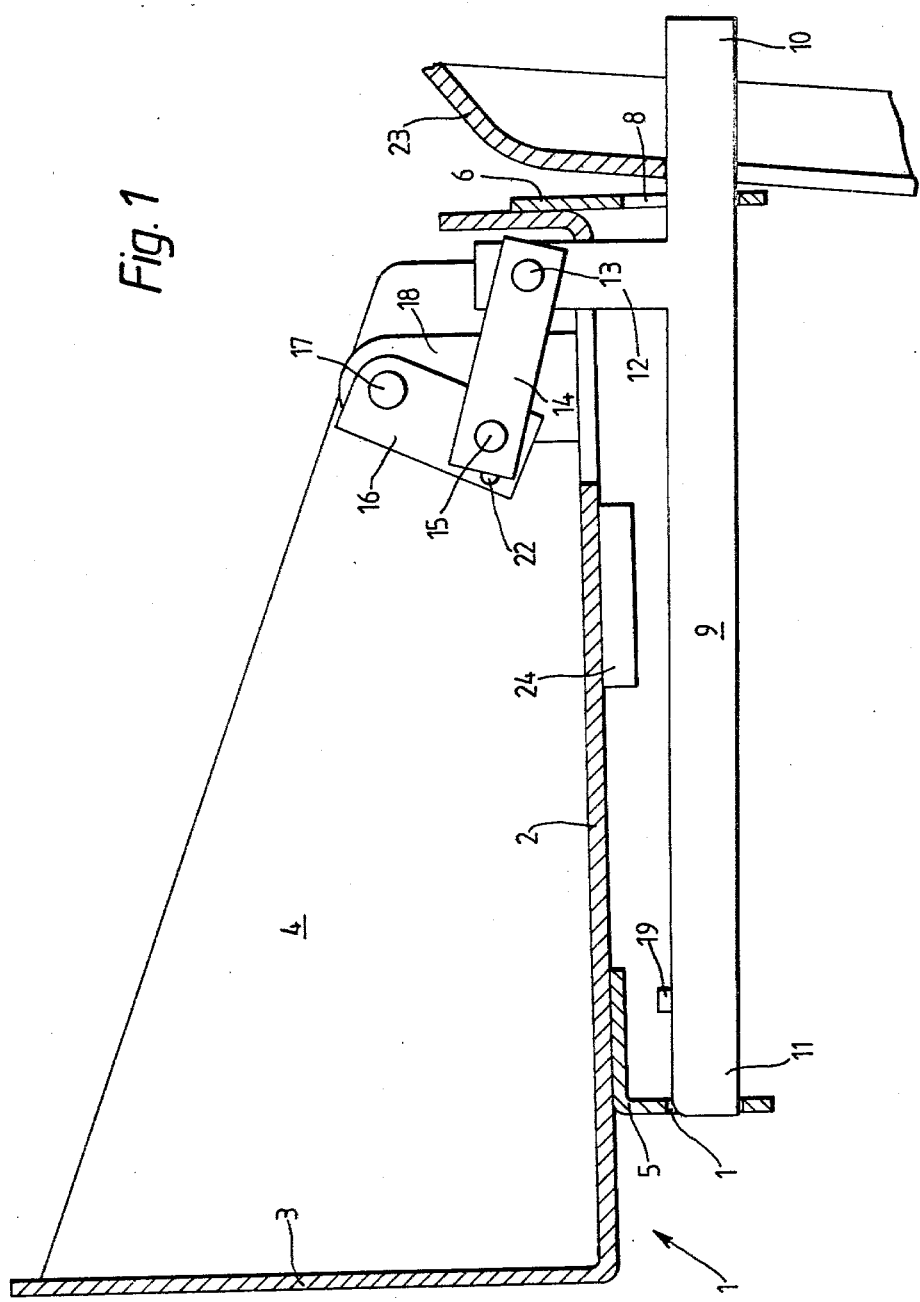

The spare-wheel carrier comprises a bracket 1 having a substantially horizontal plate or backing member 2 being at one end threreof connected to (or integrally made with) a substantially vertical mounting member 3 intended for being fastened to e.g. the chassis of a motor vehicle. To stiffen the bracket 1 there is preferably provided one or more stiffening plates 4, only one being shown on the drawing. Extending from the lower side of the backing member 2 there is provided an inner holder 5 having one leg adjustably fastened to the backing member 2, e.g. by means of screws extending through elongated openings or cooperating with a series of holes in the backing member. The inner holder also comprises a leg extending substantially perpendicularly from the backing member and having an elongated opening 7. An outer holder 6 is not adjustable relatively the backing member 2 but extends downwardly and appoximately perpendicularly from the lower side of the backing member 2 and is provided with an elongated opening 8 having a bigger vertical extention than the elongated opening 7. In engagement with the two holders 5 and 6 there is provided an enlongated supporting member or bar 9 the outer end of which protrudes beyond the outer holder 6 and constitutes a hook 10. The inner end of the bar 9 is displaceable in the opening 7 of the inner holder 5 so that this end of the bar will constitute a locking member 11 (FIGS. 2 and 3). The size of the elongated openings 7 and 8 is such that the supporting bar 9 is freely displaceable therethrough, the inner opening 7 having a height only slightly exceeding the height of the locking member 11. As indicated above the outer opening 8 has a height considerably higher than the hook 10 of the supporting bar 9. This means that the outer end portion of the supporting bar 9 can be raised and lowered in the elongated opening between a first position (shown in FIG. 1) where the distance between the backing member 2 and the bar 9 is somewhat bigger at the outer end thereof than is the case at the inner end thereof, and a second position (shown in FIG. 3) where the distance between the outer end of the bar 9 and the plate 2 is smaller than is the case at the inner end of the bar.

For operating the supporting member 9 between the positions shown in FIGS. 1 and 3 respectively the supporting member has on its upper side and protruding therefrom an operating portion 12 extending through an elongated opening 2A in the plate 2 and being connected to a link rod 14 by means of pivotable connection 13. Further, the link rod 14 is connected to an arm 16 via another pivotable connection 15. The arm 16 is fastened to a shaft 17 which is parallell to the plate 2 but perpendicular to the longitudinal direction of the supporting member 9. The shaft 17 is journalled on a bracket 18 fastened to the plate 2 on the upper side thereof adjacent the elongated opening therethrough. Further, the shaft 17 is journalled in the stiffening plate shown on the drawings. Although not shown on the drawings the operating portion 12 of the supporting bar 9 and the arm 16 are located in one common plane while the link rod 14 is located in another plane parallell with such first mentioned plane.

When rotating the shaft 17 in clock-wise direction from the position shown in FIG. 1 the supporting bar 9 will be displaced to the left supported by the bottom surfaces of the elongated openings 7 and 8. To achieve this displacement of the bar 9 there is required about 90° rotation of the shaft 17. When rotating the shaft 17 further from the position shown in FIG. 2 the supporting bar 9 will not be displaced to the left any more due to the provision of an abutment 19 at the locking portion 11, the abutment engaging the inner holder 5. However, further rotation of the shaft 17 will cause the outer end of the supporting bar 9 to be lifted so that the supporting bar is no longer supported by the bottom surface of the elongated opening 8 but will be moved to a position closer to the plate 2. When the shaft 17 has been rotated approximately another 90° in clockwise direction from the position shown in FIG. 2 the pivot pin 15 is positioned straight above the center line of the shaft 17 which means that the distance between the supporting bar 9 and the lower side of the plate 2 is a minimum. When rotating the shaft 17 further in clockwise direction the end surface 20 of the arm 16 will engage the end surface 21 of the operating portion 12. This engagement between the end surfaces 20 and 21 will occur not until the shaft 17 has been rotated slightly past the position mentioned above representing the minimum distance between the hook 10 of the bar 9 and the lower side of the plate 2. This means that if the supporting member 9 is urged in a direction from the lower side of the plate 2 there will result a torque acting on the shaft 17 in clock-wise direction, i.e., in a direction increasing the pressure between the two end surfaces 20 and 21. Thus, there will result a locking force preventing the shaft 17 to be rotated back in a counterclockwise direction. To further guarantee that no rotation of the shaft 17 can occur due to vibrations or the like while the supporting member 9 is being urged in the direction from the plate 2 there is provided at the end of the arm 16 adjacent the pivot pin 15 a hole 22. This hole is intended for receiving a locking pin, a padlock or the like adapted to engage the link rod 14 if the shaft 17 is rotated in a counterclockwise direction thereby preventing further rotation of the shaft 17 back in this direction. Beside this safety function the locking pin or the padlock also has the purpose of preventing theft of a spare-wheel carried by the inventive carrier. In order to allow convenient rotation of the shaft 17 there might be provided at the exterior of the spare-wheel carrier (ie in the FIG. 5 on the back side of the stiffening plate 4) on an end portion of the shaft a handle or an engagement means for fastening a detachable handle or tool.

Mounting a spare-wheel on the carrier described above is done in the following manner:

According to the invention the carrier is fastened to the vehicle by means of its mounting member 3 in such a manner that a spare-wheel can be hung onto the freely protruding hook 10 (FIG. 1) so that this hook extends through the central opening of the wheel rim 23. As indicated in FIG. 1 the wheel will hang slightly at an angle. Then the wheel is swung inwardly below the carrier to a securement position indicated in FIG. 2 simply by manually pressing downwardly the upper portion of the wheel. This can be done without any considerable effort as the wheel is supported near its center. When swung to the position of FIG. 2 the wheel is manually kept in this position for a short period of time during which the shaft 17 manually is rotated approx. 90° from the position of FIG. 1 to the position of FIG. 2. During this rotation of the shaft 17 the supporting member 9 is displaced to the left (as shown on the drawings) whereby the locking portion 11 of the supporting member 9 engages with the lower side of the wheel rim 23 adjacent the central opening thereof. In this position the wheel is supported at two substantially diametrically opposed locations partly by the locking portion 11 and partly by the hook 10. In this position it is preferred there exists a short distance between the upper side of the wheel rim 23 and two or possibly more rubber pads 24 fastened to the lower side of the plate 2 at such locations that they will be situated above the plane portion of the wheel rim surrounding the central opening thereof. When rotating the shaft 17 further in clock-wise direction a frictional action between the locking portion 11 and the hook 10 at one side and the wheel rim 23 at the other side will prevent further displacement of the supporting bar 9 to the left which means that the abutment 19 possibly can be omitted in practice. However, this prevented displacement of the supporting bar 9 will at once result in lifting the outer portion of the bar 9 (ie the portion thereof close to the hook 10) in direction towards the lower side of the plate 2 so that the rubber pads 24 will engage the upper surface of the wheel rim. When rotating the shaft 17 further the rubber pads 24 will be resiliently compressed and thereby secure the wheel rim 23 against the spare-wheel carrier so that the wheel is kept in position irrespectively of vibrations or the like. The engagement between the rubber pads 24 and the wheel rim 23 is achieved at a position of rotation that would correspond to a position between those of FIGS. 2 and 3. Rotating the shaft 17 further to the position of FIG. 3 only results in an increased compression of the rubber pads 24 and in passing the dead-point of the locking-mechanism 13-16 so that the locking action really is achieved.

In order to make it possible to use the carrier for mounting spare-wheels of diffrent sizes, i.e., having different diameters of their central openings, is it preferred that the inner holder 5 be displacably (in the longitudinal direction of the supporting member 9) fastened to the plate 2. As indicated above this can be achieved by means of elongated openings and screws or as an alternative by means of series of holes in the plate 2. This possibility of moving the inner holder 5 implies that the only part necessary to adapt to a certain size of wheel rim is the supporting bar 9. However, the bar 9 is very simple construction and can be conveniently exchanged.

Further, in order to adapt the spare-wheel carrier to wheel rims having diffrent thicknesses of their portions supported by the supporting member 9 it is conveniently possible to modify the thickness or the height of the rubber pads 24 or to place a certain number of washers between the rubber pads and the lower side of the plate 2.

The invention can be modified within the scope of the following claim.

I claim:

1. Spare-wheel carrier comprising a backing member adapted to be carried by a motor vehicle, said backing member having connection with a hook positioned in such a manner that a first edge portion of a wheel rim at the central opening thereof can be brought into engagement with the hook for allowing the wheel to be swung about the hook to a position substantially parallel with said backing member characterized in that the hook is movable together with a locking member, said locking member being displaceable for engagement with that side of a second edge portion of the wheel rim remote from the backing member when the wheel rim has been swung to its position substantially parallel with the backing member, and that said hook is movable to a position closer to the backing member for urging the wheel rim against the backing member.

2. Spare-wheel carrier according to claim 1 characterized in that the hook and the locking member are provided at opposite ends of a supporting member, said supporting member being connected with the backing member in the vicinity of the locking member in such a manner as to be displaceable in its longitudinal direction and swingable about an axis perpendicular thereto.

3. Spare-wheel carrier according to claim 2 characterized in that the supporting member has an operating portion in the vicinity of the hook, said operating portion extending to that side of the backing member remote from the supporting member and being connected to an operating and locking mechanism for displacing and swinging the supporting member.

4. Spare-wheel carrier according to claim 3 characterized in that the operating and locking mechanism comprises an arm swingable about an axis parallel to a swinging axis of the supporting member, said arm being pivotably connected to the operating portion by means of a link-rod.

* * * * *